United States Patent
Stockhammer et al.

(10) Patent No.: US 6,929,175 B2
(45) Date of Patent: Aug. 16, 2005

(54) ACCESS CONTROL DEVICE

(75) Inventors: Rudolf Stockhammer, Gilgen (AU); Bernhard Wiesinger, Salzburg (AU)

(73) Assignee: SkiData AG, Gartenau (AT)

( * ) Notice: Subject to any disclaimer, the term of this patent is extended or adjusted under 35 U.S.C. 154(b) by 0 days.

(21) Appl. No.: 10/381,166

(22) PCT Filed: Aug. 24, 2001

(86) PCT No.: PCT/EP01/09806

§ 371 (c)(1), (2), (4) Date: Mar. 19, 2003

(87) PCT Pub. No.: WO02/27669

PCT Pub. Date: Apr. 4, 2002

(65) Prior Publication Data

US 2003/0234287 A1 Dec. 25, 2003

(30) Foreign Application Priority Data

Sep. 19, 2000 (DE) .......................... 100 46 335

(51) Int. Cl.[7] .............................. G06K 5/00; G06F 17/60
(52) U.S. Cl. ...................... 235/379; 235/382; 235/384; 235/385; 346/42; 164/903; 49/46; 340/522; 340/5.2; 340/825.31; 343/797
(58) Field of Search .......................... 235/93, 379, 382, 235/384–385, 487, 492, 375; 346/42; D25/51; 194/903; 105/341.5; 49/46, 47; 343/797; 340/5.2, 528, 825.31, 5.8, 5.7

(56) References Cited

U.S. PATENT DOCUMENTS

| D284,705 S | * | 7/1986 | Smith ........................... D25/51 |
| 5,124,535 A | | 6/1992 | Kocznar et al. |
| D333,874 S | * | 3/1993 | Diamond ...................... D25/51 |
| 5,333,410 A | * | 8/1994 | Tetherton ....................... 49/35 |
| 5,478,995 A | * | 12/1995 | Wallerstorfer et al. ....... 235/382 |
| 5,661,286 A | * | 8/1997 | Fujioka ....................... 235/382 |
| 5,698,832 A | * | 12/1997 | Someya et al. ............. 235/449 |
| 5,704,163 A | * | 1/1998 | Kocznar ........................ 49/47 |
| 6,036,089 A | * | 3/2000 | Oguchi et al. .............. 235/379 |
| 6,170,194 B1 | * | 1/2001 | Kocznar et al. ............... 49/46 |
| 6,310,581 B1 | | 10/2001 | Stockhammer |
| 6,617,960 B1 | * | 9/2003 | Fischer et al. ............... 340/5.7 |
| 6,641,035 B1 | * | 11/2003 | Predescu et al. ............ 235/380 |
| 6,877,460 B1 | * | 4/2005 | Ellis ........................... 119/842 |

FOREIGN PATENT DOCUMENTS

| DE | 19743437 A1 | * | 10/1997 |
| DE | 29902969 | | 5/1999 |
| DE | 19831767 | | 1/2000 |
| WO | WO 9425939 | | 11/1994 |
| WO | WO 8803296 | | 5/1998 |

* cited by examiner

Primary Examiner—Karl D. Frech
Assistant Examiner—Daniel Walsh
(74) Attorney, Agent, or Firm—Flynn, Thiel, Boutell &Tanis, P.C.

(57) ABSTRACT

In an access control device (1) having a reader that actuates a person singling device when reading a valid data carrier, a formed body (16) is put over the reader housing (4), said body being provided with a recess (17) for that purpose.

4 Claims, 1 Drawing Sheet

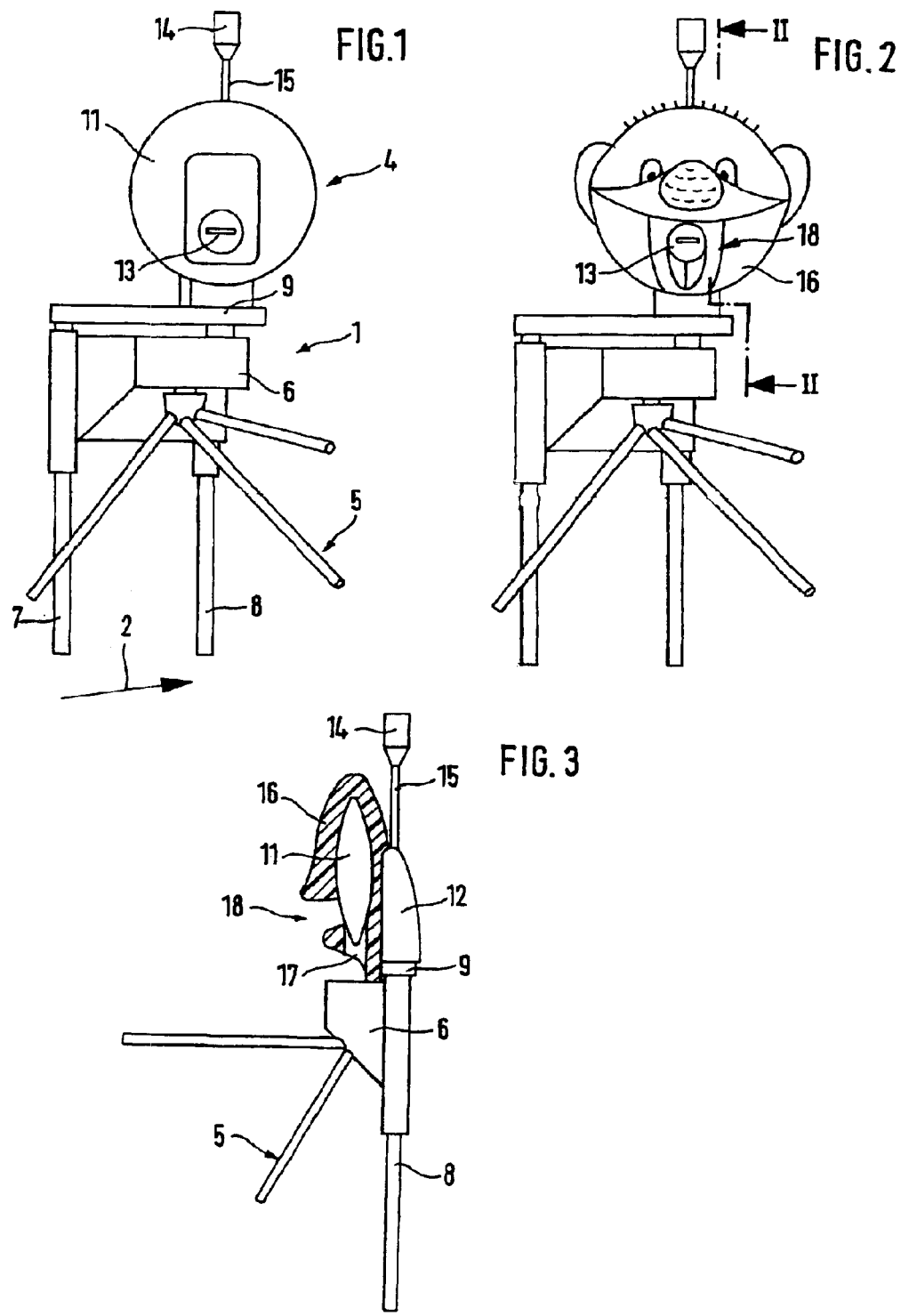

ACCESS CONTROL DEVICE

This invention relates to an access control device having a reader that actuates a person singling device when reading a valid data carrier.

Such access control devices are used for example for access to recreational facilities, such as amusement parks.

The reader of such an access control device constitutes a massive, optically unappealing box, in particular when provided with an antenna for reading contactless data carriers. In order to improve the appearance of the reader, it is known to form the front and back walls of the large antenna portion of the reader from transparent material. It is also known to design the front wall of the antenna portion as an advertising or similar information surface, so that the unfavorable optical impression arising from the massive box is mitigated by the perception of optical information (DE 198 31 767 A1).

Further, it is known to put protective covers made of foil material over the access control devices when they are not in operation in order to protect them from environmental influences.

The problem of the invention is to provide an optically appealing access control device at low cost.

This is obtained by the access control device of the invention. Advantageous embodiments of the inventive access control device are disclosed.

According to the invention, at least the front side of the reader housing is covered by a formed body. The formed body is preferably provided with a recess permitting it to be put over the reader housing. Instead, the formed body can also be mounted on the front side of the reader housing, for example by screws engaging the reader housing, clips, a Velcro band or the like The design of the formed body is preferably adapted to the architecture of the recreational facility, for example the theme of the amusement park, that is accessible via the inventive access control device.

For example, at the entrance to a fairy-tale park the formed bodies can be constituted by heads of fairy-tale figures, or clamping blocks, a football, etc. This already attunes the entering visitor to the particular theme of the fun or amusement park or the event, especially since such parks often have a plurality of adjacent entrance lanes in order to handle a large onrush of visitors.

Apart from the formed body, the access control device can remain completely unchanged according to the invention. One thus need only produce the corresponding formed body. The production of such formed bodies involves low cost.

The formed body can be made of any desired material, e.g. papier-mâché or wood. It can be of massive or hollow form. However, the formed body is preferably made of plastic. The plastic can be foamed or unfoamed. If the formed body has projections, being designed for example as a figure with nose and ears, it can also be made of rubber-elastic material in order to prevent the risk of injury.

The formed body covers preferably completely at least the front side of the reader housing visible during entry. For the formed body put over the reader to be supported, it preferably also engages over at least part of the back of the reader housing. That is, the reader housing is preferably designed so as to have at least one upwardly protruding portion that is engaged over by the formed body put over, the upwardly protruding portion of the reader housing engaging the recess of the formed body from below such that the formed body is attached to said portion of the reader housing. So that the attached formed body is fixed in this position, i.e. does not wobble, the recess of the formed body is adapted to the shape of the upwardly protruding attaching portion of the reader housing.

If a contactless data carrier with a transponder is used, the reader housing portion having the antenna can constitute the upwardly protruding portion to which the formed body put over is attached. The reader housing portion receiving the antenna is generally designed in flat-spread fashion, i.e. as a plate, in particular as a disk or bowl. A disk or bowl shape is of advantage in particular when the formed body constitutes a head.

However, the reader can also be designed for reading a passive data carrier, for example a card with a magnetic stripe and/or bar code or a contact-type smart card. The reader then has an inserting slit for insertion of the card. Also, the reader can be provided both for reading contactless data carriers, i.e. with an antenna, and for reading passive data carriers, i.e. with an inserting slit.

The inserting slit is then preferably provided in the front side of the front portion of the reader housing receiving the antenna.

To permit the data carrier to be introduced into the inserting slit, the formed body has a gap in the area of the inserting slit. The gap can be optically integrated into the formed body, e.g. constitute the mouth area of the head if the formed body is designed as a head.

The inventive access control device can have one reader for each entrance lane. However, one reader can also be disposed between two entrance lanes.

BRIEF DESCRIPTION OF DRAWINGS

In the following, an embodiment of the inventive access control device will be explained in more detail by way of example with reference to the drawing, in which:

FIG. 1 shows a front view of an access control device without a formed body;

FIG. 2 shows a view corresponding to FIG. 1 of the access control device with a formed body put over the reader; and FIG. 3 shows a side view of the access control device with the formed body cut along line III—III according to FIG. 2.

DETAILED DESCRIPTION

Access control device 1 on the entrance lane schematically shown by arrow 2 e.g. at an amusement park thus has a reader in housing 4 for driving a person singling device, i.e. unblocking turnstile 5, when reading a valid data carrier, i.e. one coded with an access entitlement. Reader housing 4 is rotated obliquely in the entry direction.

Housing 6 on which turnstile 5 is pivotally mounted is fastened in vertically adjustable fashion to a stand with two stand pipes 7, 8.

The reader in housing 4 is disposed on console 9 on rods 7, 8 of the stand. The reader is designed for reading a contactless data carrier, i.e. a transponder. It thus has an antenna disposed in disk-shaped or bowl-shaped front portion 11 of housing 4.

Disk-shaped, slightly domed front portion 11 is fastened to back housing portion 12 of reader housing 4 so that front portion 11 protrudes beyond back portion 12 upwardly and on both sides.

The reader in housing 4 can at the same time be used to read passive data carriers. Front housing portion 11 thus has inserting slit 13 on its front side into which a passive data carrier can be inserted.

Traffic light 14 is fastened to rod 15 on back housing portion 12 spaced from front housing portion 11.

Formed body 16 designed as the head of a comic figure is put over reader housing 4. Formed body 16 has downwardly open internal recess 17 for this purpose.

Formed body 16 placed with its internal recess 17 on front portion 11 of reader housing 4 completely covers the surfaces of reader housing 4 visible from entrance lane 2. For formed body 16 put over reader housing 4 to be supported, it also engages over the part of the back of front housing portion 11 protruding upward and to the side, i.e. it engages between rod 15 with traffic light 14 and front housing portion 11. According to FIG. 3, recess 17 of formed body 16 is adapted to the contour of the area of front housing portion 11 protruding beyond back portion 12 upwardly (and to the side). Formed body 16 designed as a head has in the area of inserting slit 13 a recess, namely opening 18 constituting the mouth area of the head.

What is claimed is:

1. An access control device having a reader in a reader housing that actuates a person singling device when reading a valid data carrier, the reader housing including an upwardly protruding portion and an antenna for reading contactless data carriers, a portion of the reader housing that receives the antenna comprising at least partly the upwardly protruding portion for receiving a formed body thereabout, formed body provided with a recess for mounting over the upwardly protruding portion of the reader housing, the formed body at least partly covering at least the front side of the reader housing when the access control device is in its operating condition.

2. The access control device according to claim 1, wherein the portion of the reader housing having the antenna comprises the front portion of the reader housing.

3. The access control device according to claim 1, wherein the reader housing includes an inserting slit on its front side for receiving a data carrier.

4. The access control device according to claim 1, further comprising:

a rod extending upwardly from said reader housing; and
a traffic light mounted to said rod.

* * * * *